(12) United States Patent
Breeze-Stringfellow et al.

(10) Patent No.: US 10,669,881 B2
(45) Date of Patent: Jun. 2, 2020

(54) VANE ASSEMBLY FOR AN UNDUCTED THRUST PRODUCING SYSTEM

(71) Applicant: GENERAL ELECTRIC COMPANY, Schenectady, NY (US)

(72) Inventors: Andrew Breeze-Stringfellow, Cincinnati, OH (US); Darek Tomasz Zatorski, Fort Wright, KY (US); Richard David Cedar, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1401 days.

(21) Appl. No.: 14/771,975

(22) PCT Filed: Oct. 23, 2013

(86) PCT No.: PCT/US2013/066403
§ 371 (c)(1),
(2) Date: Sep. 1, 2015

(87) PCT Pub. No.: WO2014/066515
PCT Pub. Date: May 1, 2014

(65) Prior Publication Data
US 2016/0010487 A1 Jan. 14, 2016

Related U.S. Application Data

(60) Provisional application No. 61/717,445, filed on Oct. 23, 2012, provisional application No. 61/717,451, (Continued)

(51) Int. Cl.
*F01D 17/16* (2006.01)
*B64C 11/46* (2006.01)
(Continued)

(52) U.S. Cl.
CPC ............ *F01D 17/16* (2013.01); *B64C 11/001* (2013.01); *B64C 11/18* (2013.01); *B64C 11/46* (2013.01);
(Continued)

(58) Field of Classification Search
CPC ....... B64C 11/001; B64C 11/18; B64C 11/46; B64C 11/48; F01D 17/16; F01D 9/02;
(Continued)

(56) References Cited

U.S. PATENT DOCUMENTS 2,620,122 A * 12/1952 Curry ........................ F02C 7/04
415/143
2,913,055 A * 11/1959 Quick ................... B64C 23/005
416/180
(Continued)

FOREIGN PATENT DOCUMENTS

| CN | 1204005 A | 1/1999 |
| CN | 101657607 A | 2/2010 |

(Continued)

OTHER PUBLICATIONS

Non-Final Rejection towards related U.S. Appl. No. 14/437,872 dated Jun. 1, 2017.
(Continued)

*Primary Examiner* — Thai Ba Trieu
*Assistant Examiner* — Dapinder Singh
(74) *Attorney, Agent, or Firm* — Dority & Manning, P.A.

(57) ABSTRACT

A unshrouded vane assembly for an unducted propulsion system includes a plurality of vanes which have non-uniform characteristics configured to generate a desired vane exit swirl angle.

31 Claims, 10 Drawing Sheets

Related U.S. Application Data filed on Oct. 23, 2012, provisional application No. 61/771,314, filed on Mar. 1, 2013.

(51) Int. Cl.

| | |
|---|---|
| *F02K 3/02* | (2006.01) |
| *F02C 6/20* | (2006.01) |
| *B64C 11/00* | (2006.01) |
| *F01D 9/02* | (2006.01) |
| *F02K 1/46* | (2006.01) |
| *B64C 11/18* | (2006.01) |
| *B64C 11/48* | (2006.01) |

(52) U.S. Cl.
CPC ............ *B64C 11/48* (2013.01); *F01D 9/02* (2013.01); *F02C 6/206* (2013.01); *F02K 1/46* (2013.01); *F02K 3/025* (2013.01); *B64C 11/00* (2013.01); *F05B 2240/12* (2013.01); *F05B 2260/96* (2013.01); *F05D 2220/324* (2013.01); *F05D 2220/325* (2013.01); *F05D 2250/30* (2013.01); *F05D 2250/51* (2013.01); *F05D 2250/52* (2013.01); *F05D 2260/14* (2013.01); *Y02E 10/721* (2013.01); *Y02T 50/66* (2013.01); *Y02T 50/671* (2013.01)

(58) Field of Classification Search
CPC .. F02C 6/206; F02K 1/46; F02K 3/025; F05B 2240/12; F05B 2260/96; F05D 2220/324; F05D 2220/325; F05D 2250/30; F05D 2250/51; F05D 2250/52; F05D 2260/14; Y02E 10/721; Y02T 50/66; Y02T 50/671
USPC .......................................................... 415/148
See application file for complete search history.

(56) References Cited

U.S. PATENT DOCUMENTS

| | | | |
|---|---|---|---|
| 2,999,630 A | | 9/1961 | Warren et al. |
| 4,171,183 A | * | 10/1979 | Cornell .................. B64C 11/00 416/223 R |
| 4,370,097 A | * | 1/1983 | Hanson .................. B64C 11/16 415/119 |
| 4,486,146 A | | 12/1984 | Campion |
| 4,569,199 A | | 2/1986 | Klees et al. |
| 4,607,657 A | | 8/1986 | Hirschkron |
| D286,880 S | * | 11/1986 | Smith, Jr. .................. D15/1 |
| 4,784,575 A | | 11/1988 | Nelson et al. |
| 4,907,946 A | | 3/1990 | Ciokajlo et al. |
| 5,054,998 A | | 10/1991 | Davenport |
| 5,190,441 A | | 3/1993 | Murphy et al. |
| 5,259,187 A | | 11/1993 | Dunbar et al. |
| 5,345,760 A | | 9/1994 | Giffin |
| 5,457,346 A | | 10/1995 | Blumberg et al. |
| 5,950,308 A | | 9/1999 | Koff et al. |
| 6,547,518 B1 | | 4/2003 | Czachor et al. |
| 6,792,758 B2 | | 9/2004 | Dowman |
| 6,905,303 B2 | * | 6/2005 | Liu .......................... F01D 5/26 29/889.22 |
| 7,762,766 B2 | | 7/2010 | Shteyman et al. |
| 8,382,430 B2 | | 2/2013 | Parry et al. |
| 8,459,035 B2 | | 6/2013 | Smith et al. |
| 8,762,766 B2 | | 6/2014 | Ferguson et al. |
| 9,593,582 B2 | | 3/2017 | Dejeu et al. |
| 2004/0197187 A1 | | 10/2004 | Usab et al. |
| 2004/0234372 A1 | | 11/2004 | Shahpar |
| 2010/0014977 A1 | | 1/2010 | Shattuck |
| 2010/0111674 A1 | | 5/2010 | Sparks |
| 2011/0150659 A1 | | 6/2011 | Micheli et al. |
| 2011/0192166 A1 | | 8/2011 | Mulcaire |
| 2012/0177493 A1 | | 7/2012 | Fabre |
| 2013/0104522 A1 | | 5/2013 | Kupratis |
| 2013/0315701 A1 | * | 11/2013 | Neuteboom ............ B64C 11/48 415/1 |
| 2015/0003993 A1 | | 1/2015 | Kim et al. |
| 2015/0098813 A1 | | 4/2015 | Jarrett, Jr. et al. |

FOREIGN PATENT DOCUMENTS

| | | |
|---|---|---|
| EP | 0385913 A1 | 9/1990 |
| EP | 0887259 A2 | 12/1998 |
| EP | 1493900 A2 | 1/2005 |
| EP | 2532082 A2 | 12/2012 |
| EP | 2562082 A2 | 2/2013 |
| EP | 3093443 A1 | 11/2016 |
| GB | 2196390 A | 4/1988 |
| KR | 101179277 B1 | 9/2012 |
| WO | 2005111413 A1 | 11/2005 |
| WO | 2011020458 A2 | 2/2011 |
| WO | 2011094477 A2 | 8/2011 |
| WO | 2011107320 A1 | 9/2011 |
| WO | 2004033295 A1 | 12/2012 |

OTHER PUBLICATIONS

Non-Final Rejection towards related U.S. Appl. No. 14/438,006 dated Jul. 25, 2017.
Canadian Office Action issued in connection with corresponding CA Application No. 2887262 dated Feb. 2, 2017.
European Office Action issued in connection with related EP Application No. 16192167.1 dated Feb. 9, 2017.
Andrew Breeze-Stringfellow et al., filed Apr. 23, 2015, U.S. Appl. No. 14/437,872.
Darek Tomasz Zatorski, filed Apr. 23, 2015, U.S. Appl. No. 14/438,006.
Theodorsen, "The Theory of Propellers", NACA (National Advisory Committee for Aeronautics), pp. 1-53, 1944.
Crigler, "Application of Theodorsen's Theory to Propeller Design", NACA (National Advisory Committee for Aeronautics) Rep. 924, pp. 83-99, 1948.
Smith, "Unducted Fan Aerodynamic Design", Turbomachinery, vol. No. 109, Issue No. 03, pp. 313-324, 1987.
Yamamoto et al., "Numerical Calculation of Propfan/Swirl Recovery Vane Flow Field", 28th Joint Propulsion Conference and Exhibit, pp. 1-8, Jul. 6-8, 1992.
PCT Search Report and Written Opinion issued in connection with related PCT Application No. PCT/US2013/066383 dated Apr. 15, 2014.
PCT Search Report and Written Opinion issued in connection with related PCT Application No. PCT/US2013/066392 dated Jun. 4, 2014.
Unofficial English Translation of Chinese Office Action issued in connection with related CN Application No. 201380055486.2 dated Oct. 9, 2015.
Canadian Office Action issued in connection with related CA Application No. 2887262 dated Mar. 11, 2016.
Unofficial English Translation of Chinese Office Action issued in connection with related CN Application No. 201380055512.1 dated Jan. 12, 2016.
International Search Report and Written Opinion dated Feb. 25, 2014 which was issued in connection with PCT Patent Application No. PCT/US2013/066403 which was filed on Oct. 23, 2013.
Miller, et al., filed Oct. 7, 2015, U.S. Appl. No. 14/877,210.
Zatorski ,et al., filed Apr. 23, 2015, U.S. Appl. No. 14/438,006.
Stringfellow, et al., filed Apr. 23, 2015, U.S. Appl. No. 14/437,872.

* cited by examiner

US 10,669,881 B2

VANE ASSEMBLY FOR AN UNDUCTED THRUST PRODUCING SYSTEM

This application is a National Phase of PCT/US2013/066403, filed Oct. 23, 2013, which claims priority to U.S. Provisional Application No. 61/771,314, filed Mar. 1, 2013, and to U.S. Provisional Application No. 61/717,445 filed Oct. 23, 2012, and to U.S. Provisional Application No. 61/717,451 filed Oct. 23, 2012.

BACKGROUND OF THE INVENTION

The technology described herein relates to an unducted thrust producing system, particularly a vane assembly paired with rotating elements. The technology is of particular benefit when applied to "open rotor" gas turbine engines.

Gas turbine engines employing an open rotor design architecture are known. A turbofan engine operates on the principle that a central gas turbine core drives a bypass fan, the fan being located at a radial location between a nacelle of the engine and the engine core. An open rotor engine instead operates on the principle of having the bypass fan located outside of the engine nacelle. This permits the use of larger fan blades able to act upon a larger volume of air than for a turbofan engine, and thereby improves propulsive efficiency over conventional engine designs.

Optimum performance has been found with an open rotor design having a fan provided by two contra-rotating rotor assemblies, each rotor assembly carrying an array of airfoil blades located outside the engine nacelle. As used herein, "contra-rotational relationship" means that the blades of the first and second rotor assemblies are arranged to rotate in opposing directions to each other. Typically the blades of the first and second rotor assemblies are arranged to rotate about a common axis in opposing directions, and are axially spaced apart along that axis. For example, the respective blades of the first rotor assembly and second rotor assembly may be co-axially mounted and spaced apart, with the blades of the first rotor assembly configured to rotate clockwise about the axis and the blades of the second rotor assembly configured to rotate counter-clockwise about the axis (or vice versa). In appearance, the fan blades of an open rotor engine resemble the propeller blades of a conventional turboprop engine.

The use of contra-rotating rotor assemblies provides technical challenges. One such challenge is transmitting power from the power turbine to drive the blades of the respective two rotor assemblies in opposing directions. A second challenge is minimizing the acoustic signature of the rotors. This is demanding because varied aircraft angles of attack cause the swirl angles into the rotor blades to vary circumferentially. The leading edges of blades with higher input swirl angles are loaded more heavily and tend to be more effective acoustic radiators of the noise of the upstream rotor. Another challenge, in part related to minimizing acoustic signature of the rotors, arises with installing the rotors on an aircraft. Rotor blades located near aircraft flow surfaces, including, for example, wings, fuselages, and pylons, can contribute to interaction penalties by disturbing the desired distribution of flow seen by the aircraft flow surface. This leads to suboptimal levels of resultant swirl into the wake of the aircraft and propulsion system and reduced propulsive efficiency.

It would be desirable to provide an open rotor propulsion system which more efficiently integrates with an aircraft.

BRIEF DESCRIPTION OF THE INVENTION

An unshrouded vane assembly for an unducted propulsion system includes a plurality of vanes which have non-uniform characteristics configured to generate a desired vane exit swirl angle.

BRIEF DESCRIPTION OF THE DRAWINGS

The accompanying drawings, which are incorporated in and constitute a part of the specification, illustrate one or more embodiments and, together with the description, explain these embodiments. The drawings include illustrations of radial sections taken through stages of axial flow airfoils and nearby aircraft surfaces, and are typically referred to as "roll-out-views." These views are generated by sectioning airfoil stages and aircraft surfaces at a fixed radial dimension (measured radially from the common airfoil stage centerline), then unrolling or 'rolling-out' the sections to view them in two dimensional space while maintaining circumferential and axial relationships between the airfoil stages and aircraft surfaces. In all of the Figures which follow, like reference numerals are utilized to refer to like elements throughout the various embodiments depicted in the Figures. In the drawings.

DETAILED DESCRIPTION OF THE INVENTION

Figure 1:
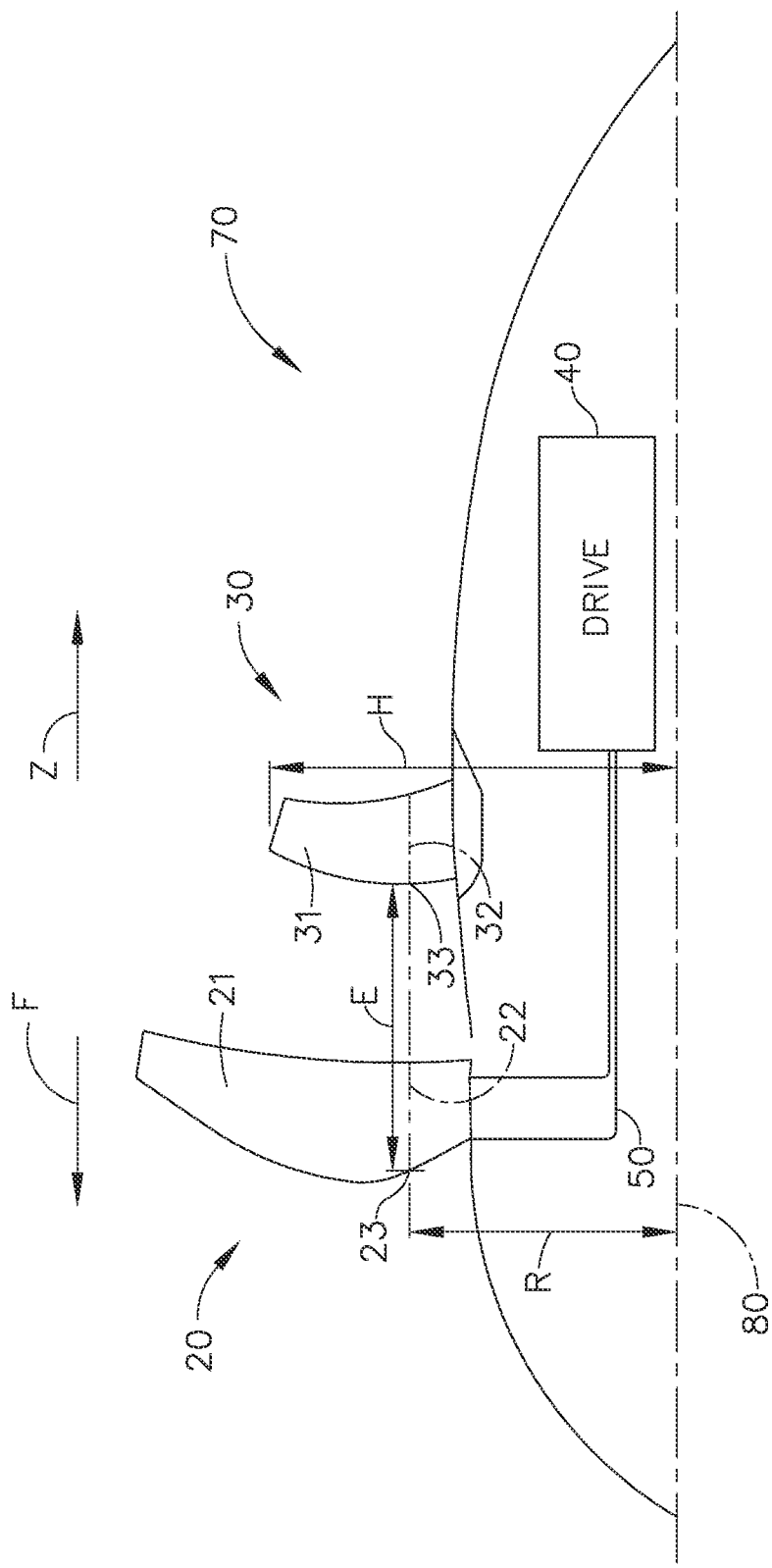
FIG. 1 shows an elevational cross-sectional view of an exemplary unducted thrust producing system.

FIG. 1 shows an elevational cross-sectional view of an exemplary unducted thrust producing system 70. As is seen from FIG. 1, the unducted thrust producing system 70 takes the form of an open rotor propulsion system and has a rotating element in the form of rotatable propeller assembly 20 on which is mounted an array of blades 21 around a central longitudinal axis 80 of the propulsion system 70. Propulsion system 70 also includes in the exemplary embodiment a non-rotating stationary element, vane assembly 30, which includes an array of vanes 31 also disposed around central axis 80. For reference purposes, a forward direction for the unducted thrust producing system is depicted with the arrow and reference letter F.

As shown in FIG. 1, the exemplary propulsion system 70 also includes a drive mechanism 40 which provides torque and power to the propeller assembly 20 through a transmission 50. In various embodiments, the drive mechanism 40 may be a gas turbine engine, an electric motor, an internal combustion engine, or any other suitable source of torque and power and may be located in proximity to the propeller assembly 20 or may be remotely located with a suitably configured transmission 50. Transmission 50 transfers power and torque from the drive mechanism 40 to the propeller assembly 20 and may include one or more shafts, gearboxes, or other mechanical or fluid drive systems.

Blades 21 of propeller assembly 20 are sized, shaped, and configured to produce thrust by moving a working fluid such as air in a direction Z as shown in FIG. 1 when the propeller assembly 20 is rotated in a given direction around the longitudinal axis 80. In doing so, blades 21 impart a degree of swirl to the fluid as it travels in the direction Z. Vanes 31 of the stationary element are sized, shaped, and configured to decrease the swirl magnitude of the fluid so as to increase the kinetic energy that generates thrust for a given shaft power input to the rotating element. For both blades and vanes, span is defined as the distance between root and tip. Vanes 31 may have a shorter span than blades 21, as shown in FIG. 1, for example, 50% of the span of blades 21, or may have longer span or the same span as blades 21 as desired. Dimension H in FIG. 1 represents the radial height of vane 31 measured from longitudinal axis 80. Vanes 31 may be attached to an aircraft structure associated with the propulsion system, as shown in FIG. 1, or another aircraft structure such as a wing, pylon, or fuselage. Vanes 31 of the stationary element may be fewer or greater in number than, or the same in number as, the number of blades 21 of the rotating element and typically greater than two, or greater than four, in number.

Vanes 31 may be positioned aerodynamically upstream of the blades 21 so as to serve as counter-swirl vanes, i.e., imparting tangential velocity which is opposite to the rotation direction of the propeller assembly 20. Alternatively, and as shown in FIG. 1, vanes 31 may be positioned aerodynamically downstream of the blades 21 so as to serve as de-swirl vanes, i.e., imparting a change in tangential velocity which is generally counter to that of the propeller assembly 20.

Figure 2:
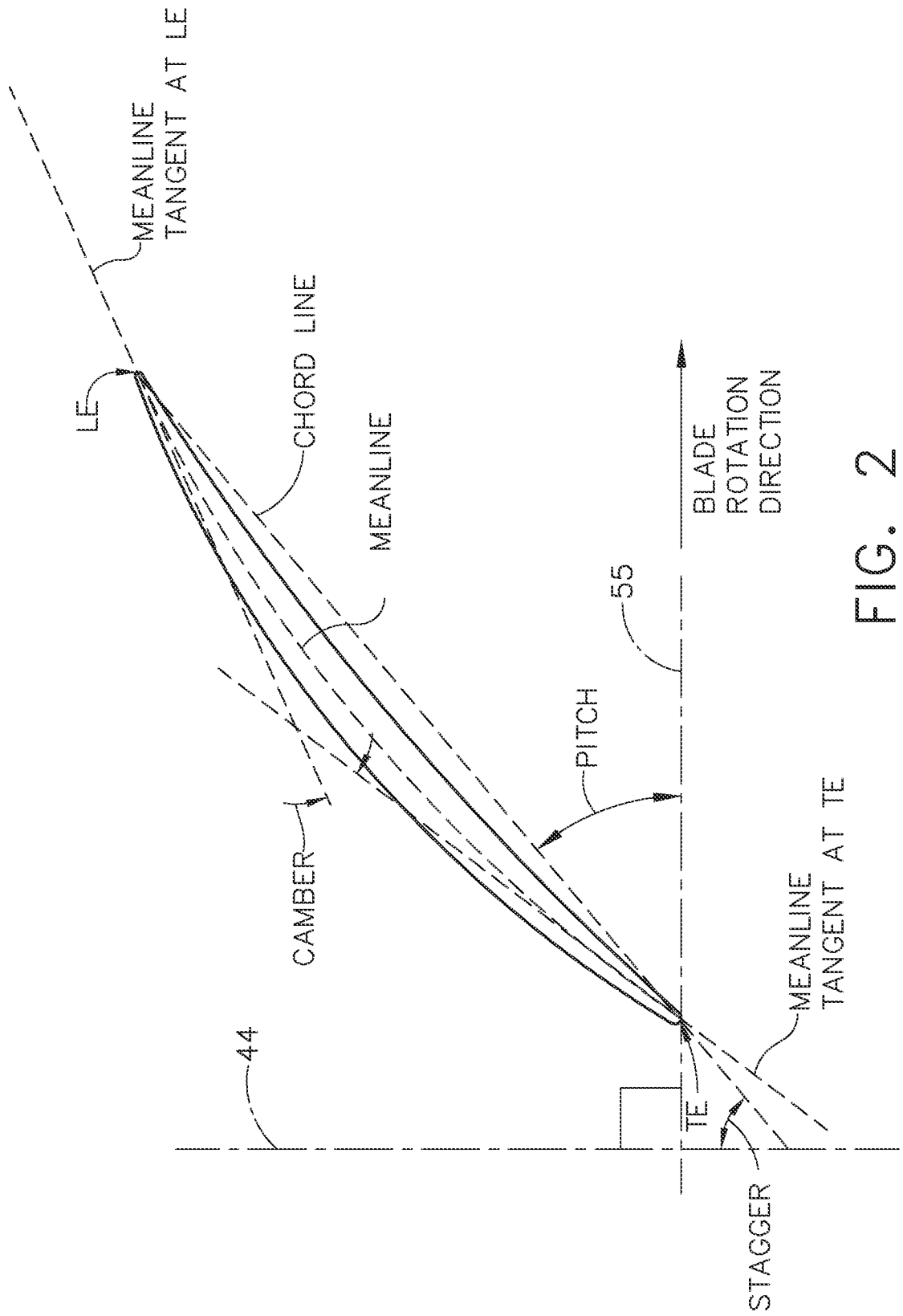
FIG. 2 depicts graphically how various parameters such as camber and stagger angle are defined with respect to a blade or vane.

FIG. 2 depicts graphically how various parameters such as camber and stagger angle are defined with respect to a blade or vane. An airfoil meanline is a described as a line that bisects the airfoil thickness (or is equidistant from the suction surface and pressure surface) at all locations. The meanline intersects the airfoil at leading edge and trailing edge. The camber of an airfoil is defined as the angle change between the tangent to the airfoil meanline at the leading edge and the tangent to the angle meanline at the trailing edge. The stagger angle is defined as the angle the chord line makes with the centreline axis. Reference line 44 is parallel to axis 11, and reference line 55 is orthogonal to reference line 44.

As mentioned above, FIG. 3 through FIG. 7 each include illustrations of radial sections taken through stages of axial flow airfoils and nearby aircraft surfaces, and are typically referred to as "roll-out-views." These views are generated by sectioning airfoil stages and aircraft surfaces at a fixed radial dimension measured radially from longitudinal axis 80, reference dimension R in FIG. 1. When blades 21 and vanes 31 of respective propeller assembly 20 and vane assembly 30 are sectioned at reference dimension R, corresponding blade sections 22 and vanes sections 32 are generated. Then the blade sections 22 and vanes sections 32 are unrolled or 'rolled-out' to view the sections in two-dimensional space while maintaining the circumferential and axial relationships between the airfoil stages and any nearby aircraft surfaces. Reference dimension E for the axial spacing between blade sections 22 and vane sections 32. This allows the propeller assembly 20 and the vane assembly 30 in FIG. 3 through FIG. 7 to be described in two dimensions. An axial dimension, parallel to the longitudinal axis 80 and generally aligned with the direction Z of the moving working fluid shown in FIG. 1, and a 'rolled-out' or flattened circumferential dimension X, orthogonal to the axial dimension.

Figure 3:
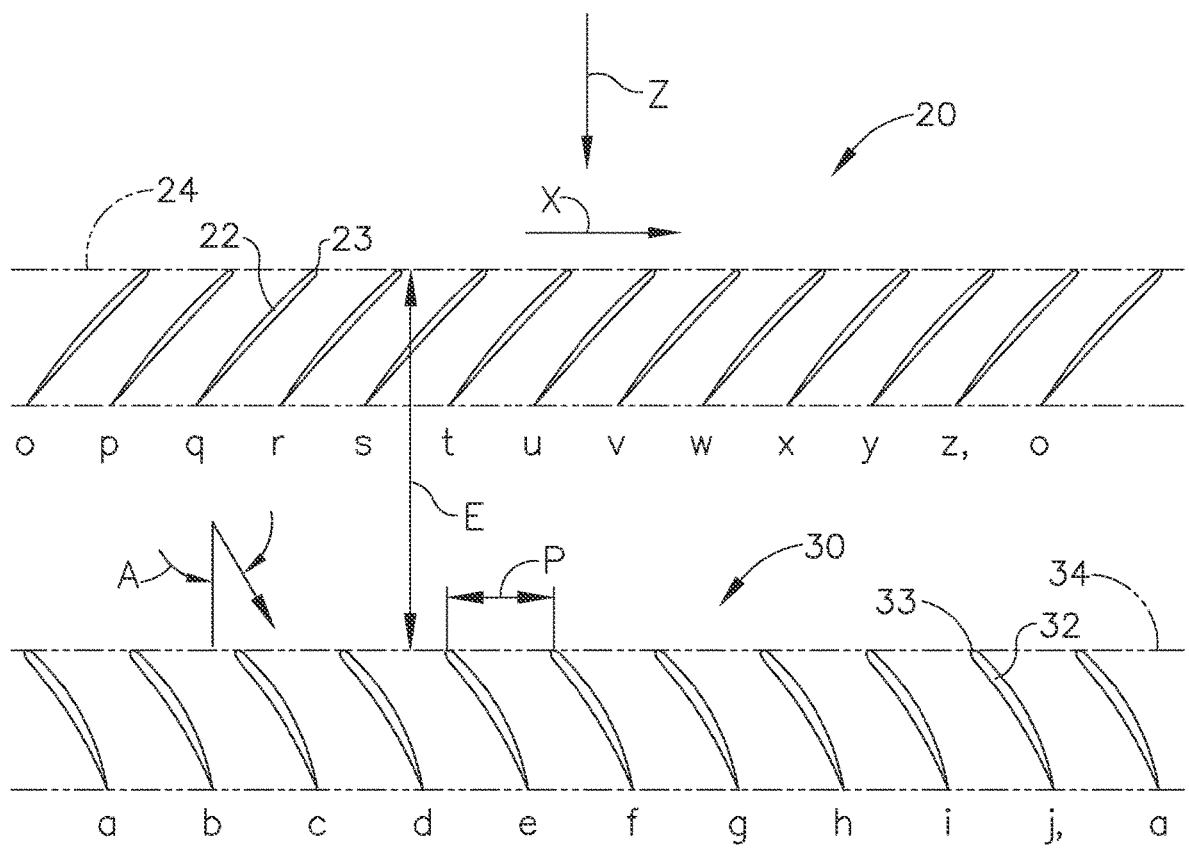
FIG. 3 shows a cross-sectional illustration "roll-out view" of an exemplary unducted thrust producing system with uniform vanes.

FIG. 3 describes a cross-sectional illustration "roll-out view" of propeller assembly 20 which as depicted has twelve blade sections 22. Each blade section 22 is individually labeled with lower case letters o through z, with the section 22 labeled o repeating at the end of the sequence to highlight the actual circumferential nature of propeller assembly 20. Each blade section 22 has a blade leading edge 23. A line positioned in the circumferential direction X through each blade leading edge 23 defines a rotor plane 24. Each blade 21 and related section 22 are spaced apart from each other and are located axially at the rotor plane 24.

Similar to the propeller assembly 20, the vane assembly 30 depicted in FIG. 3 has ten vanes sections 32, individually labeled a through j, each with a vane leading edge 33. A line positioned in the circumferential direction through each vane leading edge 33 defines a stator plane 34. In FIG. 3, each vane 31 and related section 32 in the vane assembly 30 is identical in size, shape, and configuration, and is evenly spaced circumferentially from each other, reference dimension P, and evenly spaced axially from the rotor plane 24, reference dimension E. A nominal, evenly distributed circumferential spacing P, between vanes 31 can be defined by the following equation using the radial height of the reference dimension R, and the number of vanes 31, N, in vane assembly 30; $P=R*2*\pi/N$.

Figure 4:
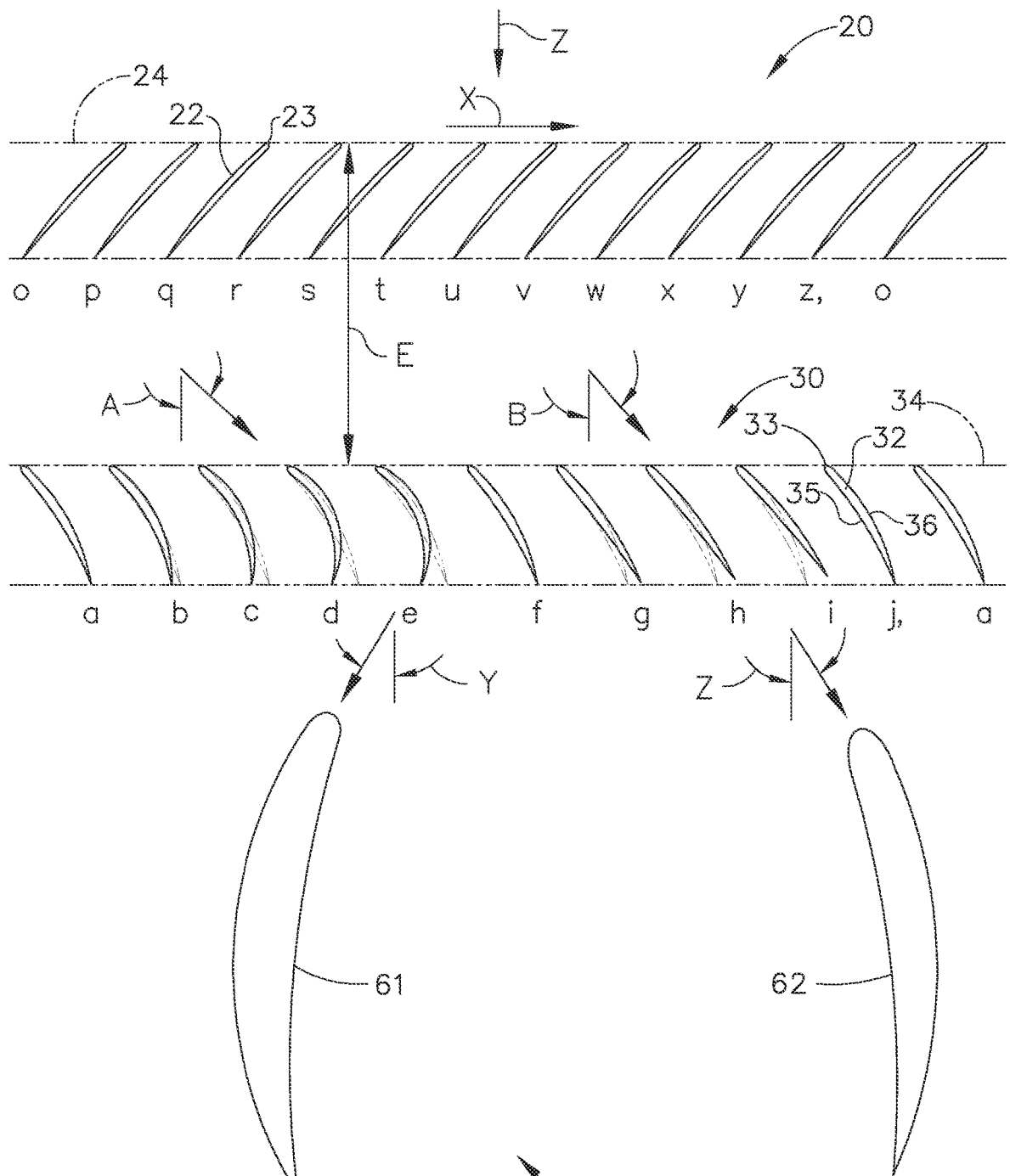
FIG. 4 shows a cross-sectional illustration "roll-out view" of an exemplary unducted thrust producing system with vanes with non-uniform stagger angle and non-uniform camber angle, as well as nearby aircraft surfaces.
Figure 5:
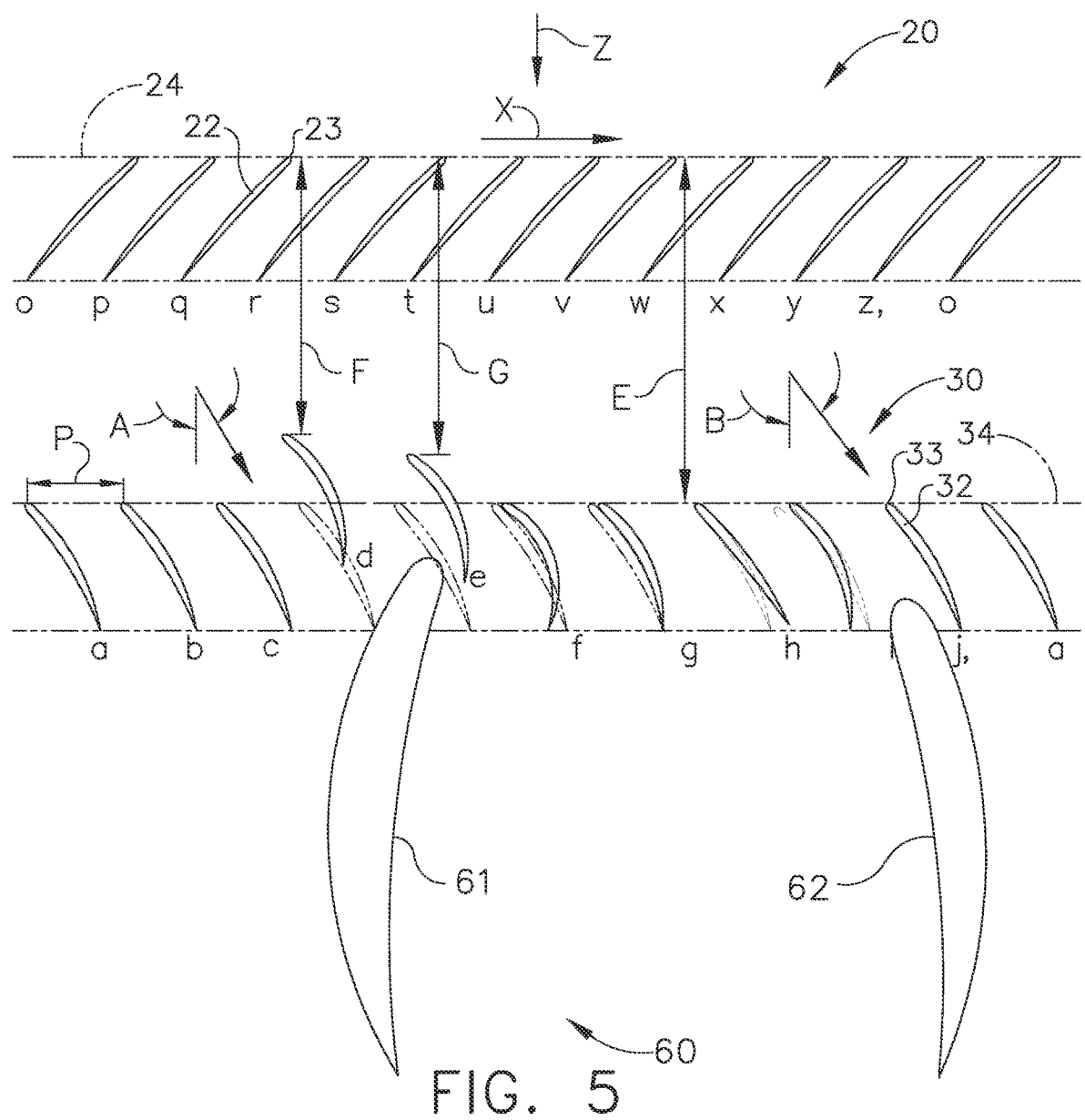
FIG. 5 shows a cross-sectional illustration "roll-out view" of an exemplary unducted thrust producing system with vanes with non-uniform stagger angle and non-uniform camber angle, with some vanes varying in axial and circumferential position, as well as nearby aircraft surfaces.
Figure 6:
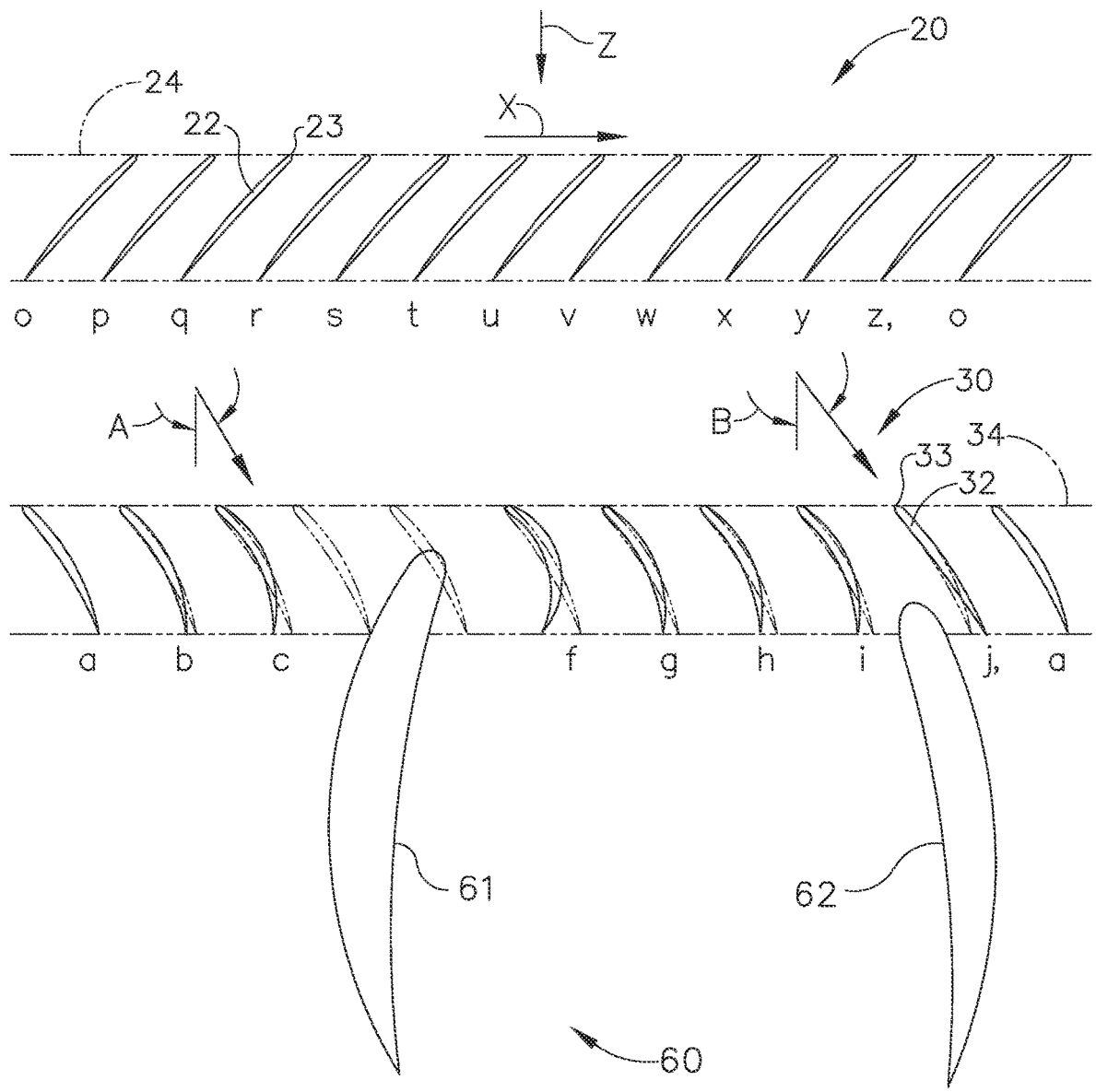
FIG. 6 shows a cross-sectional illustration "roll-out view" of an exemplary unducted thrust producing system with vanes with non-uniform stagger angle and camber angle, with some non-uniform vanes in axial and circumferential position, with vanes removed near aircraft surfaces.

To optimize the installed performance and acoustic signature of the propulsion system 70 when integrated with an aircraft, it may be desirable to change the size, shape, configuration, axial spacing relative to the rotor plane 24, and relative circumferential spacing of each vane 31 or group of vanes 31 and their related sections 32 in the vane assembly 30. Exemplary embodiments of this propeller system 20 and vane system 30 are shown in FIG. 4, FIG. 5 and FIG. 6. In each of these figures, the propeller assembly 20 and vane assembly 30 are located axially forward of the aircraft surface 60. Additionally, an exemplary embodiment of an aircraft surface 60 is represented as two wing sections 61, and 62. Note that two wing sections are present in each "roll-out view," because the radial section that generates these installed views cuts through the wing of an aircraft in two circumferential locations. For the non-uniform vanes 31 in all of the Figures which follow, this dashed and solid line depiction method is used to refer to exemplary embodiments of nominal and non-nominal vane sections 32 respectively.

To minimize the acoustic signature it is again desirable to have the aerodynamic loading of the vane leading edges 32 to all be similar and be generally not highly loaded. To maximize the efficiency and minimize the acoustic signature of the propeller assembly 20, a desired goal would be to minimize the variation in static pressure circumferentially along the propeller assembly 20. To maximize the performance of the vane assembly 30, another goal would be have to neither the aerodynamic loadings of the vane leading edges 32 nor the vane suction 35 and pressure surface 36 diffusion rates lead to separation of the flow.

To maximize the performance of the aircraft surface 60, depicted in these exemplary embodiments as a wing sections 61 and 62, one goal may be to keep the wing loading distribution as similar to the loading distribution the wing was designed for in isolation from the propulsion system 70, thus maintaining its desired design characteristics. The goal of maintaining the aircraft surface 60 performance as designed for in isolation from the propulsion system 70 applies for aircraft surfaces that may be non-wing, including, for example, fuselages, pylons, and the like. Furthermore, to maximize the performance of the overall aircraft and propulsion system 70 one of the goals would be to leave the lowest levels of resultant swirl in the downstream wake. As described herein, the non-uniform characteristics of the vanes are tailored to accommodate the effects of such an aircraft structure.

This optimal performance can be accomplished in part by developing non-uniform vane exit flow angles, shown in FIG. 4 as angles Y and Z, to minimize interaction penalties of the installation and reduce acoustic signature. The first exemplary embodiment of this is shown in FIG. 4, where each vane 31 and related vane section 32 in the vane assembly 30 are evenly spaced circumferentially from each other and evenly spaced axially from the rotor plane 24. However, the nominal (without pitch change) stagger angle and camber of the vane sections 32 in FIG. 4 vary to provide optimal exit flow angles into the aircraft surface 60, reference vane sections 32 labeled b through e, and g through i.

FIG. 5 shows another exemplary embodiment of vane assembly 30 providing flow complimentary to aircraft surface 60. In FIG. 5, vanes 31 and related vane sections 32 in vane assembly 30 are not evenly spaced circumferentially from each other, nor are they evenly spaced axially from the rotor plane 24. The degree of non-uniformity may vary along the span of a vane. Two vanes 31 are spaced axially forward of the stator plane 34, reference dimensions F and G, allowing the vane assembly 30 to merge axially with the aircraft surface 60. The nominal (without pitch change) stagger angle and camber angle of the vane sections 32 vary to provide optimal exit flow angles into the wing sections 61 and 62, as shown in vane sections 32 labeled d through i.

FIG. 6 is similar to FIG. 5, but depicts the removal of two vanes 31 adjacent to wing section 61. This exemplary embodiment allows the vanes 31 to be evenly spaced axially from the rotor plane 24 and allows the wing section to merge axially with the vane assembly 30.

Although the location of the propeller system 20 and vane system 30 in each of the foregoing exemplary embodiments was axially forward of the aircraft surface 60, it is foreseen that the propulsion system 70 could be located aft of the aircraft surface 60. In these instances, the prior enumerated goals for optimal installed performance are unchanged. It is desirable that the propulsion system has suitable propeller assembly 20 circumferential pressure variations, vane leading edge 32 aerodynamic loadings, and vane pressure surface 35 and suction surface 36 diffusion rates. This is accomplished in part by varying the size, shape, and configuration of each vane 31 and related vane section 32 in the vane assembly 30 alone or in combination with changing the vane 31 pitch angles. For these embodiments, additional emphasis may be placed on assuring the combined propulsion system 70 and aircraft leave the lowest levels of resultant swirl in the downstream wake.

The exemplary embodiment of the propeller assembly 20 and vane assembly 30 in FIG. 3 is designed for a receiving a constant swirl angle, reference angle A, into vanes 31 along the stator plane 34. However, as the aircraft angle of attack is varied the vanes move to off design conditions and the swirl angle into the vane assembly 30 will vary around the stator plane 34. Therefore, to keep the aerodynamic loading on the vane leading edges 33 roughly consistent along the stator plane 34, a variable pitch system that would rotate either each vane 31 or group of vanes 31 a different amount is desirable. Such a pitch change can be accomplished by rotating a vane 31 in a solid body rotation along any axis, including, for example, the axis along the centroid of vane section 32 or an axis along the vane leading edge 33. The desire for similar aerodynamic loading on the vane leading edges 33 is in part driven by the desire to keep the acoustic signature of the propulsion system 70 low. Vanes 31 with high leading edge loadings tend to be more effective acoustic radiators of the noise created from the gust of the upstream propeller assembly 20. The exemplary embodiment of the propeller system 20 and vane system 30 in FIG. 7 describes this desired variation in vane 31 via changes in vane section 32 pitch angles. For ease of explanation, we define the chord line angle of vanes at the design point as stagger and hence variations between vanes at the design point as stagger variations. As the engine moves to different operating conditions, vanes may rotate around an axis referred to as pitch change of the vanes. Variations in vane section chord angles that result from these sold body rotations are referred to as pitch angle variations.

Figure 7:
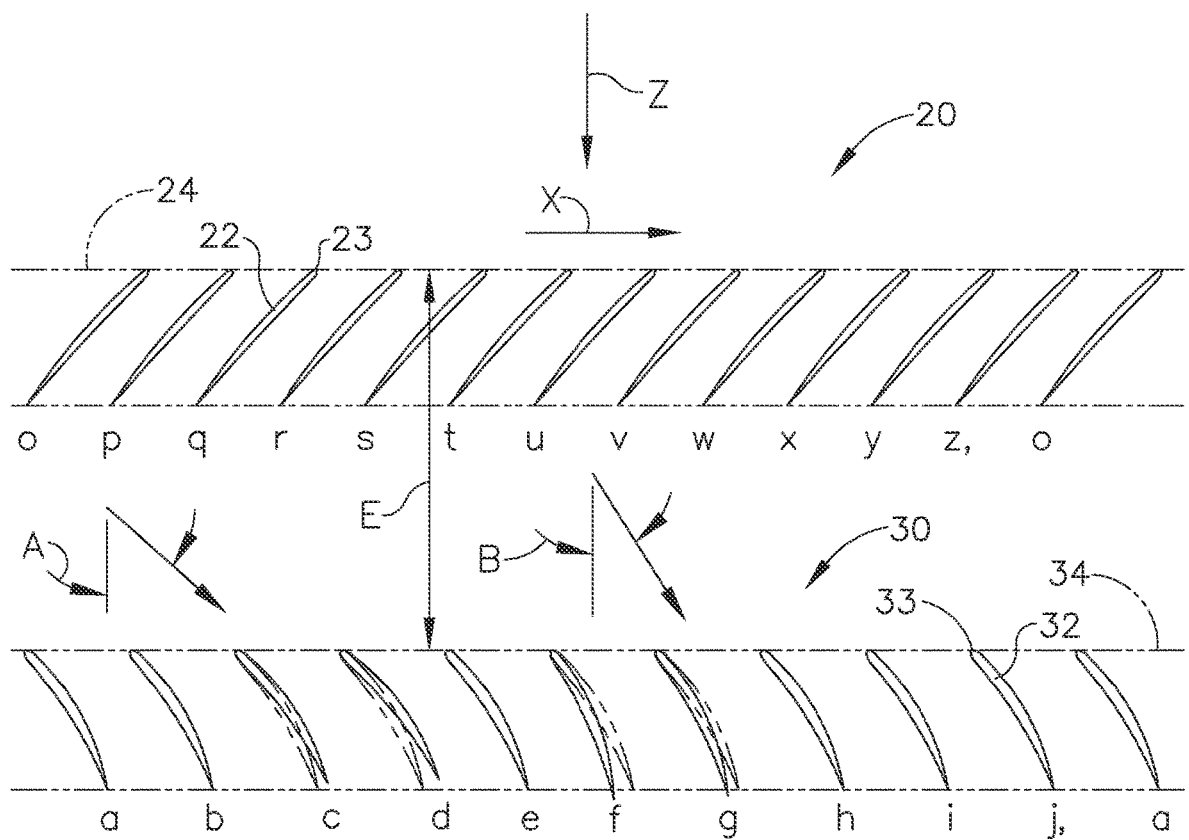
FIG. 7 shows a cross-sectional illustration "roll-out view" of an exemplary unducted thrust producing system with vanes with non-uniform pitch angle.

In FIG. 7, each vane 31 and related vane section 32 in the vane assembly 30 is identical in size, shape, and configuration, and are evenly spaced circumferentially from each other and evenly spaced axially from the rotor plane 24. However, the pitch angles of the vane sections 32 in FIG. 7 vary as they represent a change in the vane 31 pitch actuation to accommodate varying input swirl, reference different input swirl angles A and B, into stator plane 34 caused in part by changes in aircraft angle of attack. As desired, this provides similar aerodynamic loading on the vane leading edges 33 to keep the acoustic signature of the propulsion system 70 low. This similar loading can be accomplished by independently changing pitch angle for individual blades or by changing pitch angles similarly for groups of vanes suitable for ganging. The vanes 31 could rotate in pitch about any point in space, but it may be desirable to maintain the original leading edge 33 circumferential spacing and rotate the vanes 31 around a point at or near their leading edge 32. This is shown in FIG. 7 using vane sections 32 labelled c, d, f, and g, where the nominal staggered vane sections 32 are depicted in dashed lines and the rotated (or pitched) vane sections 32 are depicted as solid lines.

Figure 8:
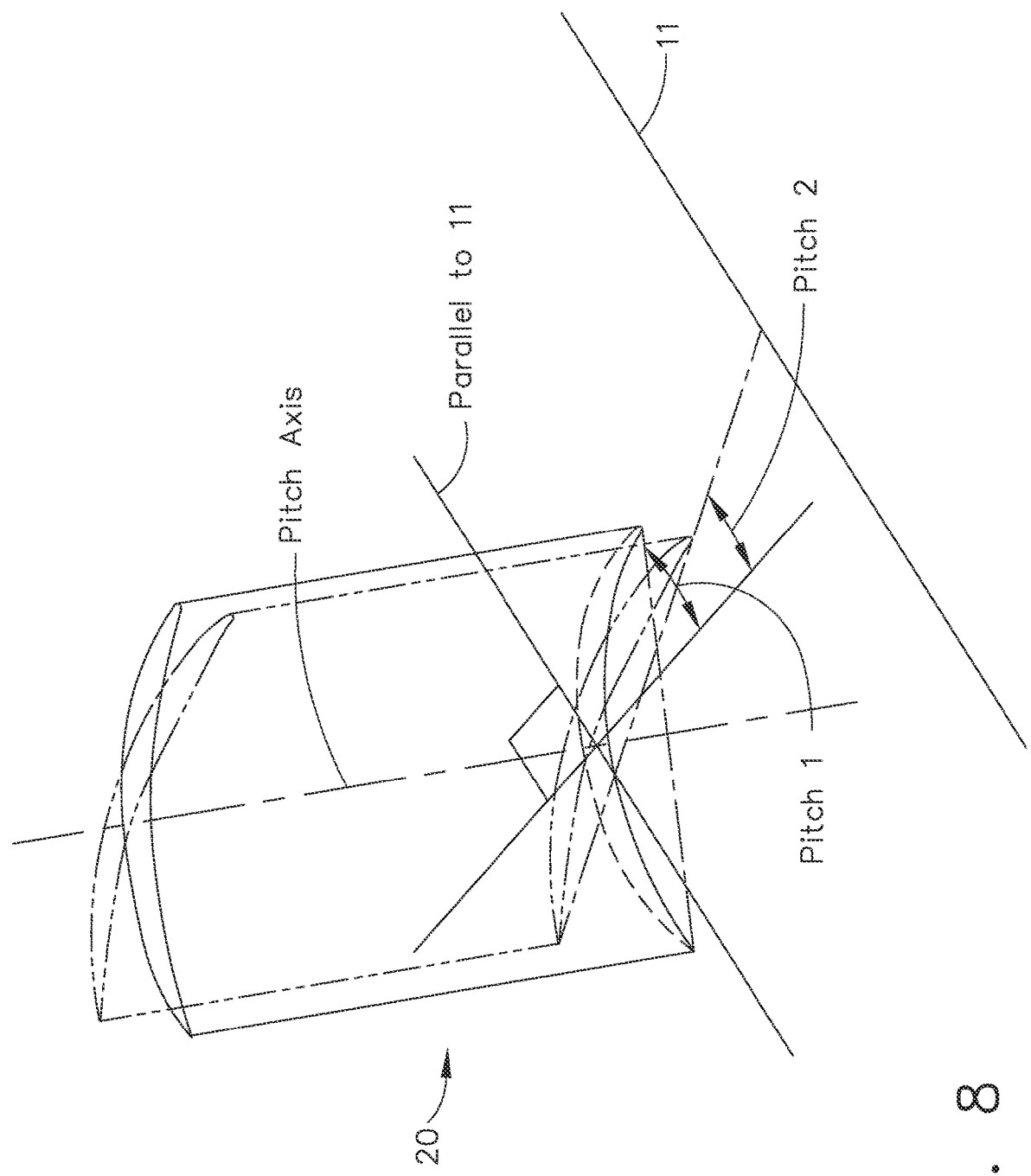
FIG. 8 depicts an exemplary embodiment of a vane with pitch change via rigid body vane motion.

As shown by way of example in FIG. 8, it may be desirable that either or both of the sets of blades 21 and vanes 31 incorporate a pitch change mechanism such that the blades and vanes can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft.

The vane system 30, as suitable for a given variation of input swirl and aircraft surface 60 installation, has non-uniform characteristics or parameters of vanes with respect to one another selected either singly or in combination from those which follow. A delta in stagger angle between neighboring vanes 31 and related vane sections 32 according to one embodiment of greater than or equal to about 2 degrees can be employed, and according to another embodiment between about 3 degrees and about 20 degrees. A delta in camber angle between neighboring vanes 31 and related vane sections 32 according to one embodiment of greater than or equal to about 2 degrees can be employed, and according to another embodiment between about 3 degrees and about 15 degrees. A circumferential spacing P at a given reference dimension R, between neighboring vanes 31 and related vane sections 32, for vane 31 counts N from about 5 to about 30, from about 10% to about 400% of the nominal, even circumferential spacing can be employed. An axial spacing from the rotor plane 24 to vanes 31 and related vane sections 32 up to about 400% of the radial height H, of the vane 31 can also be employed.

The non-uniform characteristic may be attributed to a portion of the span of the vanes, or to substantially all of the span of the vanes.

The foregoing exemplary embodiments utilized twelve blades 21 and ten vanes 31, and one aircraft surface 60, but any combination of numbers of blades 21, vanes 31, and aircraft surfaces 60 may be used.

It may be desirable to utilize the technologies described herein in combination with those described in commonly-assigned, co-pending applications [ ] and [ ].

In addition to configurations suited for use with a conventional aircraft platform intended for horizontal flight, the technology described herein could also be employed for helicopter and tilt rotor applications and other lifting devices, as well as hovering devices.

The technology described herein is particularly beneficial for aircraft that cruise with shaft power per unit annulus area of above 20 SHP/ft$^2$ (shaft horsepower per square foot) where the swirl losses can become significant. Loadings of 20 SHP/ft$^2$ and above permit aircraft to cruise at Mach numbers above 0.6 Mach number without requiring excessively large propeller areas to limit swirl losses. One of the major benefits of the invention is its ability to achieve high shaft power per unit annulus area without significant swirl loss penalties and this opens the opportunity to cruise at Mach numbers of 0.8 and above.

Figure 9:
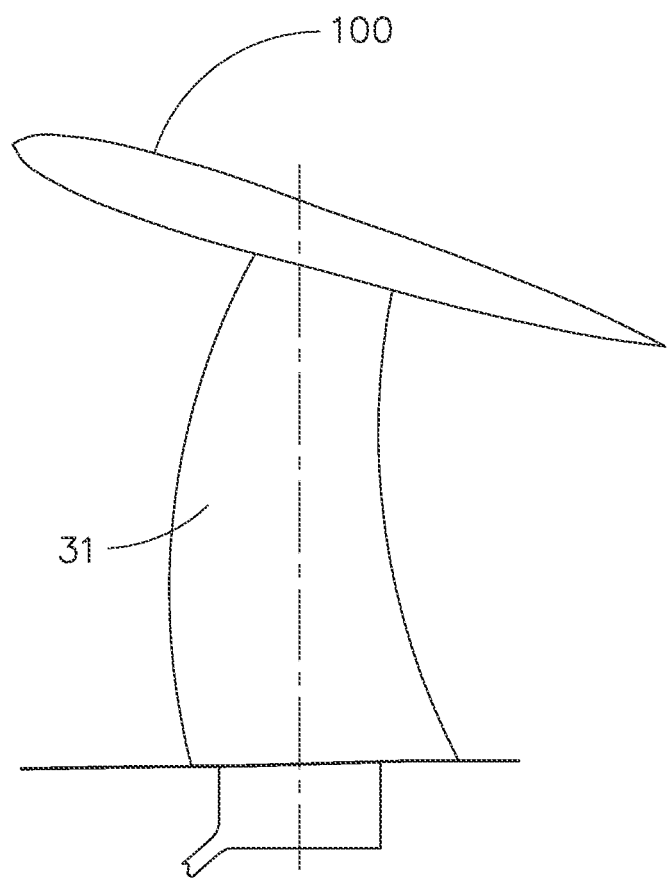
FIG. 9 is an illustration of an alternative embodiment of an exemplary vane assembly for an unducted thrust producing system.

Vanes 31 may optionally include an annular shroud or duct 100 distally from axis 80 (as shown in FIG. 9) or may be unshrouded. In addition to the noise reduction benefit the duct 100 provides a benefit for vibratory response and structural integrity of the stationary vanes 31 by coupling them into an assembly forming an annular ring or one or more circumferential sectors, i.e., segments forming portions of an annular ring linking two or more vanes 31 such as pairs forming doublets. The duct 100 may allow the pitch of the vanes to be varied as desired.

A significant, perhaps even dominant, portion of the noise generated by the disclosed fan concept is associated with the interaction between the wakes and turbulent flow generated by the upstream blade-row and its acceleration and impingement on the downstream blade-row surfaces. By introducing a partial duct acting as a shroud over the stationary vanes, the noise generated at the vane surface can be shielded to effectively create a shadow zone in the far field thereby reducing overall annoyance. As the duct is increased in axial length, the efficiency of acoustic radiation through the duct is further affected by the phenomenon of acoustic cut-off, which can be employed, as it is for conventional aircraft engines, to limit the sound radiating into the far-field. Furthermore, the introduction of the shroud allows for the opportunity to integrate acoustic treatment as it is currently done for conventional aircraft engines to attenuate sound as it reflects or otherwise interacts with the liner. By introducing acoustically treated surfaces on both the interior side of the shroud and the hub surfaces upstream and downstream of the stationary vanes, multiple reflections of acoustic waves emanating from the stationary vanes can be substantially attenuated.

Figure 10:
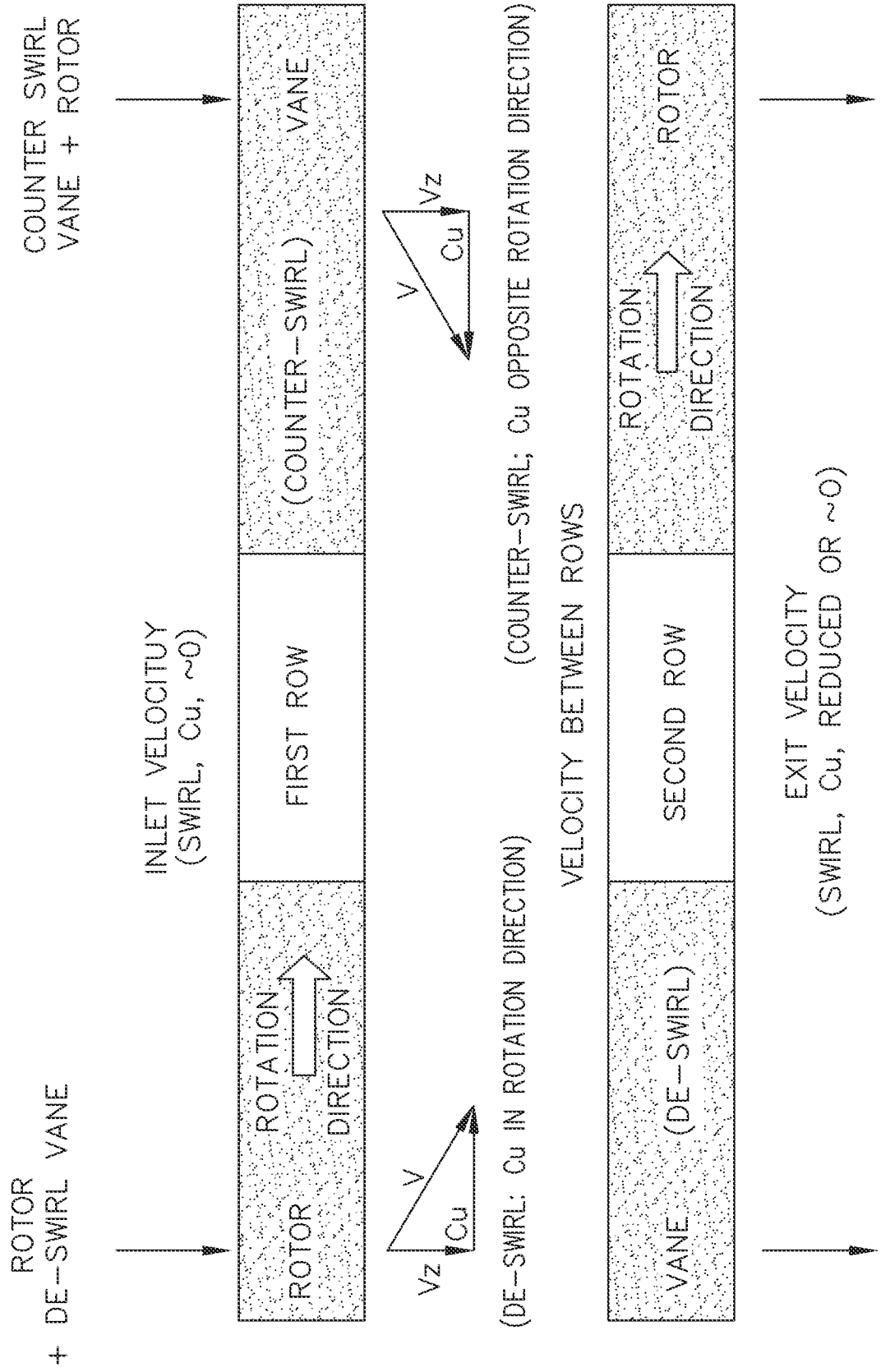
FIG. 10 depicts vector diagrams illustrating Cu through both rows for two exemplary embodiments.

FIG. 10 depicts the change in Cu across the rotating and stationary elements, where Cu is the circumferential averaged tangential velocity. Vector diagrams are shown in a coordinate system in which the axial direction is in the downward direction and tangential direction is left to right. Multiplying the Cu times the airstream radius R gives the property RCu. The blade or vane loading at a given radius R is now defined as the change in RCu across the blade row (at a constant radius or along a streamtube), here forth referred to as ΔRCu and is a measure of the elemental specific torque of said blade row. Desirably, the ΔRCu for the rotating element should be in the direction of rotation throughout the span.

The foregoing description of the embodiments of the invention is provided for illustrative purposes only and is not intended to limit the scope of the invention as defined in the appended claims. Other modifications of the invention shall be apparent to those skilled in the art from the teachings herein, and it is, therefore, desired to be secured in the appended claims all such modifications as fall within the true spirit and scope of the invention.

What is claimed is:

1. An unshrouded vane assembly for an unducted propulsion system comprising a rotating element and a vane assembly, the vane assembly having a plurality of vanes, wherein the plurality of vanes are configured to impart a change in tangential velocity of the air opposite to that imparted by the rotating element, and wherein the plurality of vanes have non-uniform characteristics with respect to one another and are configured to generate a desired vane exit swirl angle.

2. The vane assembly of claim 1, wherein the non-uniform characteristic is selected from the group consisting of: camber, stagger, circumferential spacing, axial position, span, tip radius, and combinations thereof.

3. The vane assembly of claim 2, wherein said vanes have a root, a tip, and a span therebetween, and wherein said non-uniform characteristic is attributed to a portion of the span of said vanes.

4. The vane assembly of claim 3, wherein said non-uniform characteristic is attributed to substantially all of the span of said vanes.

5. The vane assembly of claim 1, wherein said vanes are variable in pitch.

6. The vane assembly of claim 5, wherein said vanes are individually variable in pitch.

7. The vane assembly of claim 5, wherein a plurality of said vanes are variable in pitch in conjunction with one another.

8. An unducted propulsion system, said propulsion system comprising a rotating element having an axis of rotation and a stationary element, said rotating element having a plurality of blades each having a blade root proximal to said axis, a blade tip remote from said axis, and a blade span measured between said blade root and said blade tip, wherein said stationary element has a plurality of vanes, the plurality of vanes each having a vane root proximal to said axis, a vane tip remote from said axis, and a vane span measured between said vane root and said vane tip, and wherein the plurality of vanes are configured to impart a change in tangential velocity of the air opposite to that imparted by the rotating element and wherein the plurality of vanes have non-uniform characteristics with respect to one another and are configured to generate a desired vane exit swirl angle.

9. The thrust producing system of claim 8, wherein said non-uniform characteristics are tailored to accommodate the effects of an aircraft structure.

10. The thrust producing system of claim 9, wherein said aircraft structure is one of a wing, a fuselage, or a pylon.

11. The thrust producing system of claim 8, wherein said stationary element is part of an aircraft structure.

12. The thrust producing system of claim 8, wherein at least one of said vanes include a shroud distally from said axis.

13. The thrust producing system of claim 8, wherein said unducted thrust producing system is one of a tilt rotor system, a helicopter lift system, a propeller system, or an open rotor system.

14. The thrust producing system of claim 8, wherein said rotating element is driven via a torque producing device.

15. The thrust producing system of claim 14, wherein said torque producing device is selected from the group consisting of electric motors, gas turbines, gear drive systems, hydraulic motors, and combinations thereof.

16. The thrust producing system of claim 8, wherein said stationary element has a delta in stagger angle between neighboring vanes and related vane sections of greater than or equal to about 2 degrees.

17. The thrust producing system of claim 8, wherein said stationary element has a delta in stagger angle between neighboring vanes and related vane sections of between about 3 degrees and about 20 degrees.

18. The thrust producing system of claim 8, wherein said stationary element has a delta in camber angle between neighboring vanes and related vane sections of greater than or equal to about 2 degrees.

19. The thrust producing system of claim 8, wherein said stationary element has a delta in camber angle between neighboring vanes and related vane sections of between about 3 degrees and about 15 degrees.

20. The thrust producing system of claim 8, wherein said stationary element has a circumferential spacing at a given reference dimension, between neighboring vanes and related vane sections, for vane counts from about 5 to about 30, from about 10% to about 400% of a nominal, even circumferential spacing.

21. The thrust producing system of claim 8, wherein said stationary element has an axial spacing from the rotor plane to vanes and related vane sections up to about 400% of the radial height, of the vane.

22. The thrust producing system of claim 8, wherein said vane span is greater than 50% of the span of blades of said rotating element.

23. The thrust producing system of claim 8, wherein the tip radius of said vanes is greater than 50% of the tip radius of blades of said rotating element.

24. The thrust producing system of claim 8, wherein said vanes are variable in pitch.

25. The thrust producing system of claim 24, wherein said vanes are individually variable in pitch.

26. The thrust producing system of claim 24, wherein a plurality of said vanes are variable in pitch in conjunction with one another.

27. The thrust producing system of claim 8, wherein the non-uniform characteristic is selected from the group consisting of: camber, stagger, circumferential spacing, axial position, span, tip radius, and combinations thereof.

28. The thrust producing system of claim 27, wherein said vanes have a root, a tip, and a span therebetween, and wherein said non-uniform characteristic is attributed to a portion of the span of said vanes.

29. The thrust producing system of claim 28, wherein said non-uniform characteristic is attributed to substantially all of the span of said vanes.

30. The thrust producing system of claim 8, wherein the plurality of vanes are configured relative to a single stage rotating element to impart a change in tangential velocity of the air opposite to that imparted by the single stage rotating element.

31. The thrust producing system of claim 30, wherein the plurality of vanes are positioned aerodynamically downstream relative to the single stage rotating element to impart a change in tangential velocity of the air opposite to that imparted by the single stage rotating element.

* * * * *